(12) United States Patent
Alnaimat et al.

(10) Patent No.: US 11,772,988 B1
(45) Date of Patent: Oct. 3, 2023

(54) SOLAR DOME DESALINATION SYSTEM WITH ENHANCED EVAPORATION

(71) Applicant: UNITED ARAB EMIRATES UNIVERSTIY, Al Ain (AE)

(72) Inventors: Fadi Alnaimat, Al Ain (AE); Mohammed Ziauddin, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 17/965,401

(22) Filed: Oct. 13, 2022

(51) Int. Cl.
 *C02F 1/14* (2023.01)
 *C02F 1/04* (2023.01)
 *B01D 1/00* (2006.01)
 *C02F 1/36* (2023.01)

(52) U.S. Cl.
 CPC .............. *C02F 1/14* (2013.01); *B01D 1/0035* (2013.01); *C02F 1/048* (2013.01); *C02F 1/36* (2013.01); *C02F 2201/005* (2013.01)

(58) Field of Classification Search
 CPC .... C02F 1/048; C02F 1/14; C02F 1/36; C02F 2201/005; B01D 1/0035
 See application file for complete search history.

(56) References Cited

U.S. PATENT DOCUMENTS

| | | |
|---|---|---|
| 3,775,257 A | 11/1973 | Lovrich |
| 4,495,034 A | 1/1985 | Lucas |
| 5,316,626 A | 5/1994 | Guy |

(Continued)

FOREIGN PATENT DOCUMENTS

| | | |
|---|---|---|
| CN | 105413609 A | 3/2016 |
| CN | 109292868 A | 2/2019 |
| WO | 2009089371 A1 | 7/2009 |

OTHER PUBLICATIONS

Ahmed, "The Effects of Various Types and Layouts of Wick Materials on the Thermal Performance of Conventional Solar Stills," 2016 IEEE Smart Energy Grid Engineering (SEGE), Aug. 21-24, 2016, pp. 84-89: https://ieeexplore.ieee.org/document/7589505.

(Continued)

*Primary Examiner* — Brian A McCaig
(74) *Attorney, Agent, or Firm* — Nath, Goldberg & Meyer; Richard C. Litman

(57) ABSTRACT

The solar dome atomized desalination system with enhanced evaporation includes several features for enhancing evaporation of water within the solar distillation dome. The system includes a transparent solar dome with a peak point. The transparent solar dome is supported on a base that includes a bottom panel and sidewalls that form the outer perimeter of a freshwater basin. A saltwater basin is concentrically located within the freshwater basin, both of which may be square in shape. A first evaporation enhancement feature includes a plurality of reflectors for directing additional solar rays into the dome. A second evaporation enhancement feature includes an ultrasound generator centrally located on the bottom of the saltwater basin to atomize the saltwater in the saltwater basin. A third evaporation enhancement feature includes a plurality of copper structures extending from the peak of the solar dome to the perimeter of the freshwater basin.

20 Claims, 4 Drawing Sheets

(56) References Cited

U.S. PATENT DOCUMENTS

| 5,421,962 | A | * | 6/1995 | Shvarts | C02F 1/14 |
| | | | | | 203/DIG. 1 |
| 2011/0139601 | A1 | | 6/2011 | Johnstone | |
| 2011/0300661 | A1 | | 12/2011 | Pearce et al. | |
| 2014/0332364 | A1 | | 11/2014 | Lusk et al. | |
| 2015/0353385 | A1 | | 12/2015 | Wang et al. | |

OTHER PUBLICATIONS

Roshdy et al., "Experimental investigation of the performance of a single-slope solar still under Aswan climate conditions," IET Renew. Power Gener., 2021;15:3901-3914: https://www.researchgate.net/figure/Schematic-diagram-of-the-solar-still-integrated-with-an-ultrasonic-atomizer_fig5_355113206.

* cited by examiner

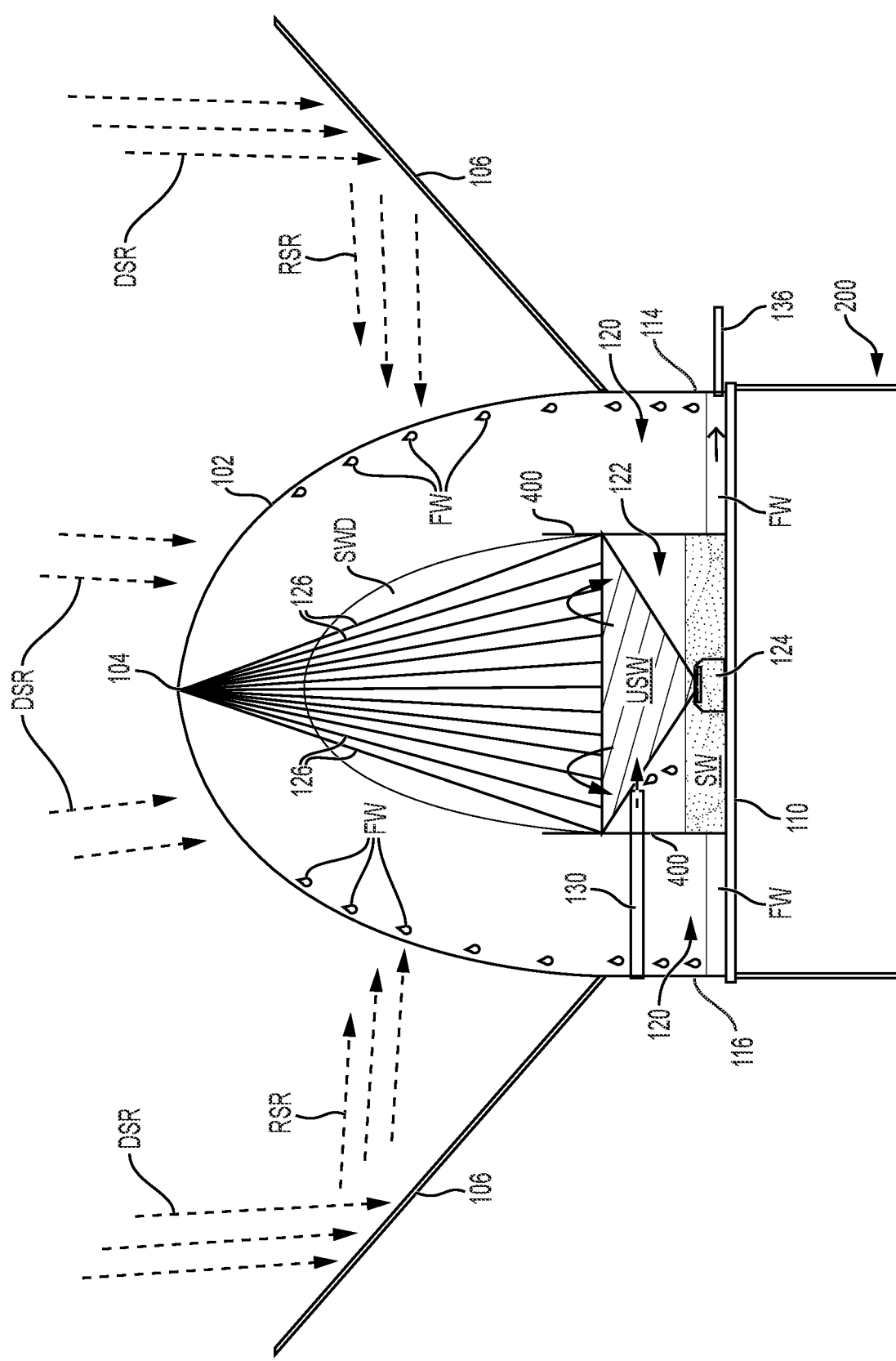

SOLAR DOME DESALINATION SYSTEM WITH ENHANCED EVAPORATION

BACKGROUND

1. Field

The disclosure of the present patent application relates to solar desalination, and particularly to a solar dome desalination system with enhanced evaporation.

2. Description of the Related Art

The world-wide increasing scarcity of freshwater has driven the search for methods of distilling freshwater from saltwater and wastewater sources. Many of these desalination systems use electrical power from the grid, or from photovoltaic (PV) panels, to power a desalination system such as reverse osmosis (RO) desalination systems. When PV panels are used, regular cleaning of the PV panels is required to remove dust and debris that negatively affect the efficiency of the PV panels, therefore lowering their power output. Many of these systems use high-pressure pumps that consume high levels of electrical energy.

Solar-thermal desalination (STD) systems such as solar dome desalination systems, are showing promise as a low or zero energy method of desalination. Direct STD systems are directly heated by solar rays. Some of these systems require pumps to feed saltwater to a solar chamber and/or drain freshwater from the solar chamber. In addition, these currently known STD systems are relatively inefficient and require a large solar chamber per volume of freshwater produced.

Thus, a solar dome desalination system with enhanced evaporation solving the aforementioned problems is desired.

SUMMARY

A solar dome atomized desalination system with enhanced evaporation as described herein includes several features for enhancing evaporation of water within the solar dome. The solar dome may be part of a distillation system. The system can include a transparent solar dome with a peak or uppermost point. The dome is transparent to allow solar energy to pass inside the dome and get captured by the copper structures, as described below.

The system may also include a first evaporation enhancement feature in the form of a plurality of reflectors for directing additional solar rays into the dome. According to this embodiment, the reflectors enhance heat transfer by effectively trapping solar radiation inside the dome.

The transparent solar dome is supported on a base, which may also be transparent. The base may be square with a square bottom panel, a rectangular front, a rectangular right sidewall, a rectangular left sidewall, and a rectangular rear wall, although other shapes, such as rectangles and the like, may be used. The bottom panel and walls of the base form an outer perimeter of a freshwater basin. A saltwater basin may be concentrically located within the freshwater basin and may also be square in shape. The walls of the saltwater basin form an inner perimeter of the freshwater basin.

A second evaporation enhancement feature in the form of an ultrasound generator may be centrally located on the bottom of the saltwater basin and is preferably configured to atomize the saltwater in the saltwater basin to enhance the evaporation of the water in the saltwater basin. According to this embodiment, the atomization process increases direct contact evaporation through generation of microdroplets and increases the rate of evaporation by increasing the surface area of the saltwater.

A third evaporation enhancement feature in the form of a plurality of elongated structures, for example, copper structures such as copper wires or thin copper strips, extend from the peak of the solar dome to the perimeter of the freshwater basin. The copper structures can be heated by the solar radiation entering the dome, thereby enhancing evaporation of the water in the saltwater droplets above the saltwater basin. The copper structures may also be coated with photothermal material to form a photothermal outer layer on their outer surface, thereby further enhancing evaporation. In this embodiment, the copper structures can capture solar energy and enhance heat transfer to provide latent heat of vaporization through direct conduction.

In certain embodiments, the present solar dome may contain one or more of the three noted evaporation enhancement features. Specifically, the solar dome can contain any of the first; second; third; first and second; first and third; second and third; and first, second, and third evaporation enhancement features.

Saltwater can be provided to the saltwater basin from a saltwater tank, or other saltwater source, via a saltwater supply pipe. A saltwater supply valve in the saltwater supply pipe can be present to regulate/stop the flow of the saltwater into the saltwater basin. In one embodiment, the saltwater tank is located at a higher level than the saltwater basin, so that the saltwater flow from the saltwater tank to the saltwater basin is gravity driven and does not require a pump. The saltwater flow may be driven by other available means, such as, by way of non-limiting example, a pump and the like.

In one embodiment, as freshwater is evaporated from the saltwater the freshwater condenses on the inner surface or wall of the solar dome and pure water, or freshwater, flows down the surface of the solar dome and collects in the freshwater basin. Freshwater from the freshwater basin can be drained into a freshwater tank, or other freshwater supply, via a freshwater drainpipe. A freshwater drain valve in the freshwater drainpipe can be used to regulate/stop the flow of freshwater draining from the freshwater basin. In one embodiment, the base is located at a higher level than the freshwater tank, so that the freshwater flow from the freshwater basin to the freshwater tank is gravity driven and does not require a pump. The freshwater flow may be driven by other available means, such as, by way of non-limiting example, a pump and the like. Optional support stands may be provided for supporting the saltwater tank above the base, and for supporting the base above the freshwater tank. A support stand may also be provided to maintain the freshwater tank above ground level, if desired.

These and other features of the present subject matter will become readily apparent upon further review of the following specification.

BRIEF DESCRIPTION OF THE DRAWINGS

FIG. 4: is an enlarged side view of a seawater atomization dome of the solar dome desalination system with enhanced evaporation of FIG. 1.

DETAILED DESCRIPTION OF THE PREFERRED EMBODIMENTS

Figure 1:
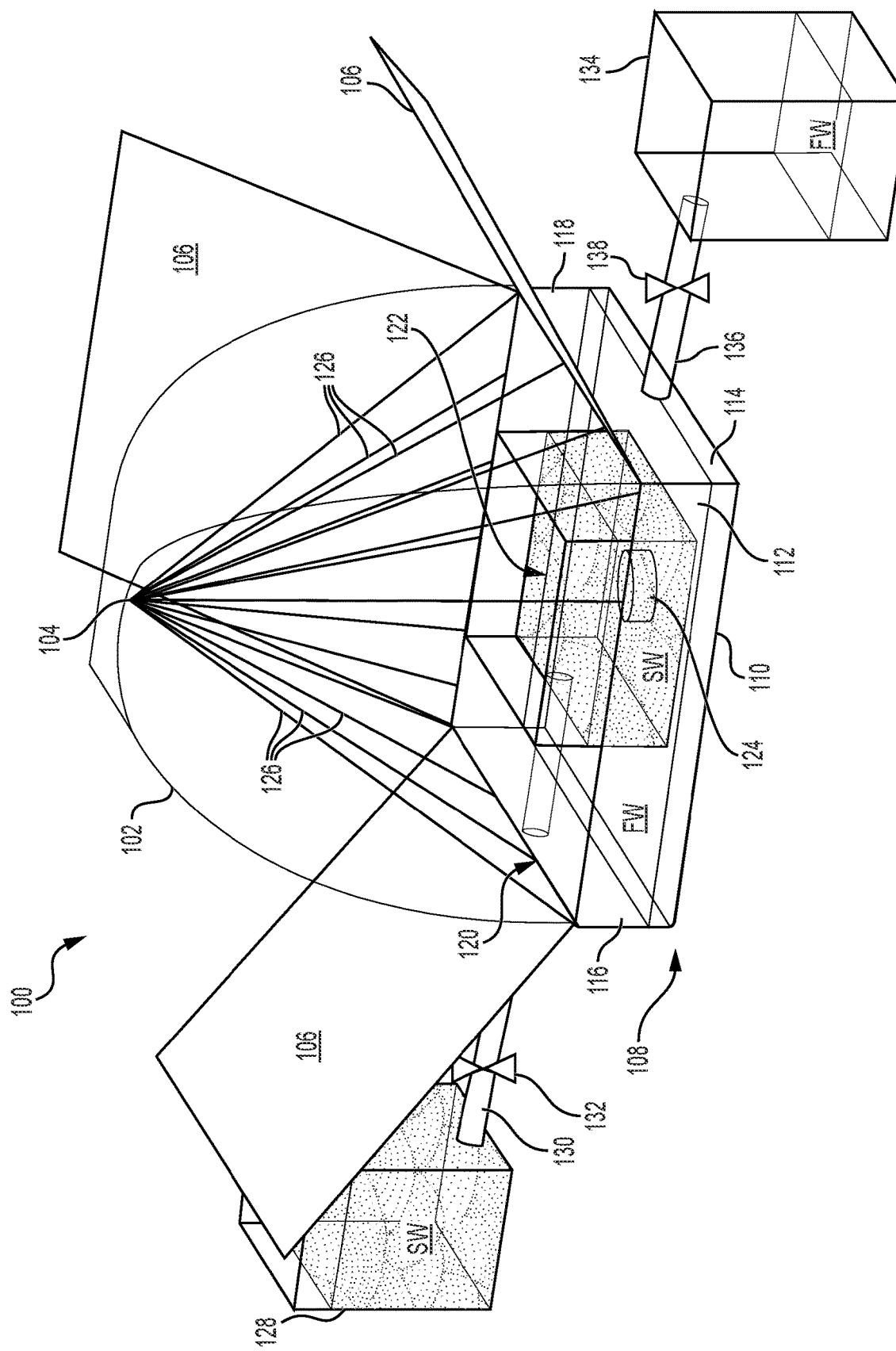
FIG. 1: is a perspective view of a solar dome desalination system with enhanced evaporation.
Figure 2:
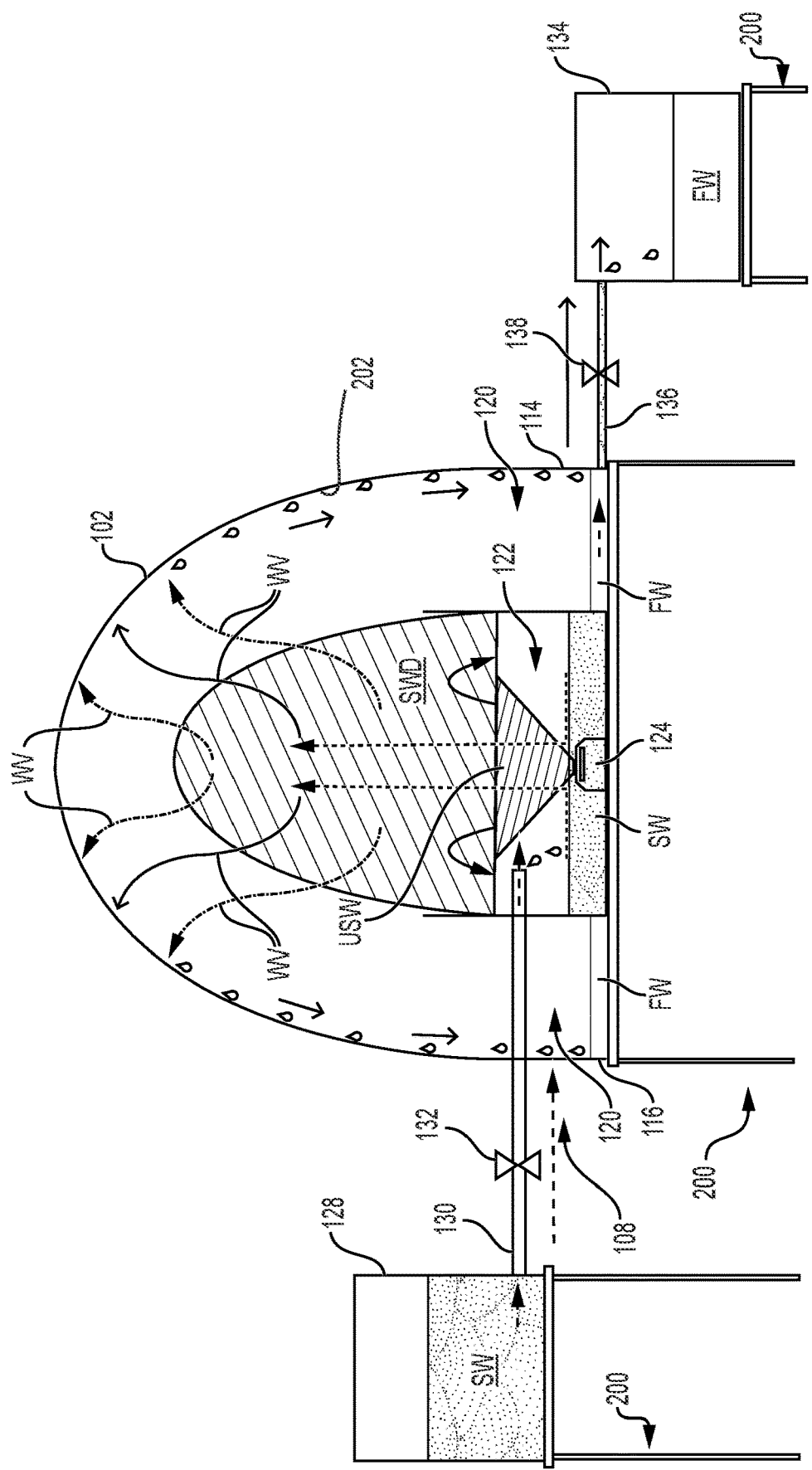
FIG. 2: is a side view of the direct solar desalination system with multistage channels of FIG. 1.

The solar dome atomized desalination system with enhanced evaporation 100 is shown in FIGS. 1, 2 and 4. As shown in FIG. 1, the system 100 includes a transparent solar dome 102 with a peak or uppermost point 104. In this embodiment, the system may also include a first evaporation enhancement feature in the form of a plurality of reflectors 106 (four in the square example shown) for directing additional solar rays into the dome 102, the front reflector being removed for clarity.

As shown in FIG. 4, the reflectors 106 reflect direct solar rays (DSR), to form reflected solar rays (RSR) that are directed into the solar dome 102. The transparent solar dome 102 is supported on a base 108, which may also be transparent as shown. The base 108 may be square as shown with a square bottom panel 110, a rectangular front 112, a rectangular right sidewall 114, a rectangular left sidewall 116, and a rectangular rear wall 118, although other shapes, by way of non-limiting example, a rectangle or the like, may be used. The bottom panel 110 and walls 112, 114, 116, 118 form the outer perimeter of a freshwater basin 120. A saltwater basin 122 is concentrically located within the freshwater basin 120 and may also be square in shape as shown, although other concentric shapes may be used for the basins 120, 122. The walls 400 of the saltwater basin 122 form the inner perimeter of the freshwater basin 120. In this embodiment, a second evaporation enhancement feature in the form of an atomizer, such as an ultrasound generator, 124 is centrally located on the bottom of the saltwater basin 122 to atomize the saltwater SW in the saltwater basin 122 to thereby enhance the evaporation of the water in the saltwater SW as described further below. According to this embodiment, the atomizer can generate low temperature saltwater droplets, micro saltwater droplets, and the like.

In the embodiment shown in FIGS. 1 and 4, a third evaporation enhancement feature in the form of a plurality of elongated structures, by way of non-limiting example, copper structures such as copper wires or thin copper strips 126, extend from the peak 104 of the solar dome 102 to the perimeter of the freshwater basin 120. The copper structures 126 are heated by the solar radiation entering the dome 102, either alone or as enhanced by the reflectors 106, thereby enhancing evaporation of the water in the saltwater droplets above the saltwater basin 122. The copper structures 126 may also be coated with photothermal material to form a photothermal outer layer on their outer surface, thereby further enhancing evaporation. In one embodiment, the droplets will gain energy and partially evaporate, separating the freshwater from the saltwater, which can subsequently trickle down to the saltwater basin (particularly in embodiments where the basin sides are covered). The vapor that goes up is condensed by direct contact with the dome inner wall.

Saltwater SW can be provided to the saltwater basin 122 from a saltwater tank 128 or other saltwater source, via a saltwater supply pipe 130. A saltwater supply valve 132 in the saltwater supply pipe 130, can be present to regulate/stop the flow of the saltwater SW into the saltwater basin 122. In one embodiment, the saltwater tank 128 is located at a higher level than the saltwater basin 122, so that the saltwater flow is gravity driven and does not require a pump. The saltwater flow may be driven by other available means, such as, by way of non-limiting example, a pump and the like. The saltwater flow may be driven by other available means, such as, by way of non-limiting example, a pump and the like.

In one embodiment, as freshwater FW is evaporated from the saltwater SW, as described in detail below, the freshwater condenses on the inner surface of the solar dome 102 and flows down the surface and into the freshwater basin 120. Freshwater FW from the freshwater basin 120 can be drained into a freshwater tank 134, or other freshwater supply, via a freshwater drainpipe 136. A freshwater drain valve 138 in the freshwater drainpipe 136 can be used to regulate/stop the flow of freshwater FW draining from the freshwater basin 120. In one embodiment, the base 108 (including freshwater basin 120) is located at a higher level than the freshwater tank 134, so that the freshwater flow is gravity driven and does not require a pump. The freshwater flow may be driven by other available means, such as, by way of non-limiting example, a pump and the like.

Figure 3:
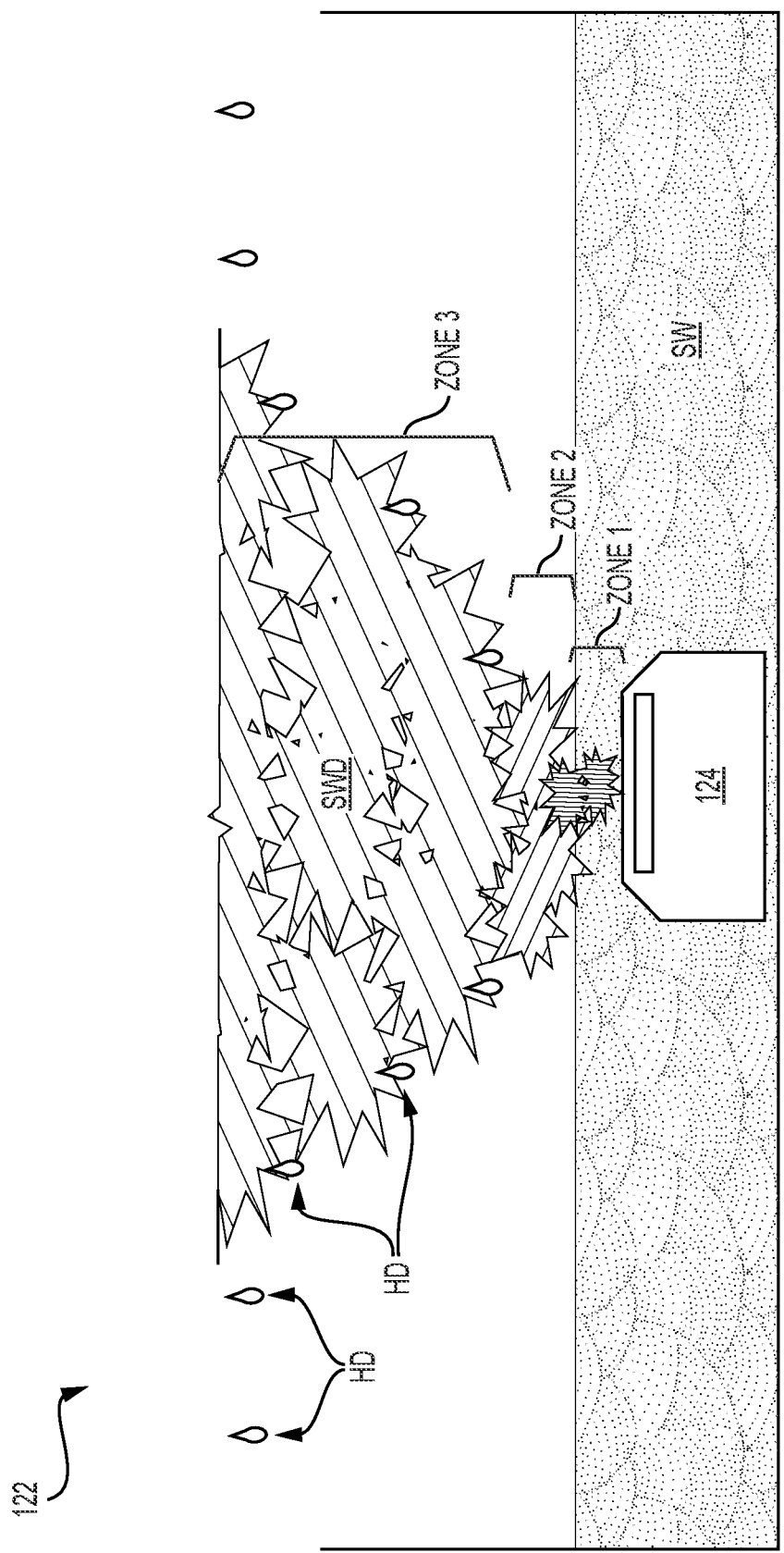
FIG. 3: is an enlarged side view of a seawater atomization tank of the solar dome desalination system with enhanced evaporation of FIG. 1.

The dynamics of the fluid flow within the solar dome 102 are shown in FIGS. 2-4. In the embodiment of FIG. 2, the optional plurality of elongated structures 126 have been removed. According to this embodiment, ultrasound waves USW emitted by the ultrasound generator 124 produce a cloud of saltwater droplets SWD over the saltwater basin 122. Turning to FIG. 3, the cloud of saltwater droplets SWD in this embodiment includes a number of zones. Zone 1 includes mainly larger droplets, while Zone 2 includes mainly smaller droplets and Zone 3 includes mainly microdroplets, the saltwater droplets SWD getting progressively smaller as they rise upwardly. Salt from evaporated droplets, and larger, heavier droplets HD, fall back into the saltwater basin 122, while water vapor WV (FIG. 2) from the evaporated droplets rises upwardly and condenses on the inner surface 202 of the solar dome 102 and flows down the surface 202 and into the freshwater basin 120 in this embodiment, as described above. In this embodiment, the atomizer, or ultrasound generator, utilizes membrane vibration to disperse the water on the membrane surface divided into the different zone, which are a function of the power supplied, frequency, and amplitude of the vibrating membrane.

According to this process, due to gravity those droplets which did not evaporate tend to fall down. As clarified in FIGS. 2 and 3, these droplets fall back in the seawater basin and do not mix with the freshwater collected inside the dome on the base. The constant generation of microdroplets leaving the surface are accounted for as rate atomization and thus, this is compensated through the flowrate of seawater from the saltwater tank to ensure a sufficient water level is above the atomizer surface to work effectively. In this regard, the control over the supply of saltwater from the saltwater tank based on the rate of evaporation can be adjusted through the saltwater supply valve, ensuring flow control. In this manner, the reducing level of the seawater in the setup is compensated from the seawater supply tank for continuous operation desalination process.

The ultrasound generator 124 is the only electrically powered component in the system, according to this embodiment. As it requires only 15 to 20 W of power at about 24V DC, it can be powered by a very small photovoltaic (PV) solar panel, DC batteries, or both. These DC batteries can be recharged by the PV solar panel. As such, the system can operate continuously on its own.

Since the present solar thermal desalination system needs less energy than those currently known, it can be portable, and it can be built at low-cost. It also enables quick maintenance, requiring no pumps, and can be easily mounted on a roof top. The main enhancements that can be achieved by the present solar thermal desalination system are: (i) thermal solar collectors for air or water heating; (ii) hybrid systems integrated with waste heat recovered from other systems such as air conditioning/mechanical vapor compression/heat pump cycle; (iii) low-pressure/vacuum evaporation and high-pressure condensation; and (iv) localized evaporation using packing material (solar absorber) that enhances surface evaporation. Accordingly, the present systems are cost effective, require less maintenance than those currently known, require no filter replacements, require fewer battery replacements, operate as stand-alone systems, off the electrical grid, are portable, and produce high quality freshwater.

Also shown in FIG. 2 are optional support stands 200 for supporting the saltwater tank 128 above base 108, and for supporting the base 108 above the freshwater tank 134, so that the saltwater and freshwater flow is gravity driven according to this embodiment, and does not require pumps, as described above. A support stand 200 may also be provided to maintain the freshwater tank 134 above ground level.

It is to be understood that the solar dome desalination system with enhanced evaporation is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A solar dome desalination system with enhanced evaporation, comprising:
a transparent solar paraboloid with a peak;
a base for supporting the transparent solar paraboloid, the base including a bottom panel and sidewalls;
a freshwater basin with an outer perimeter formed by the bottom panel and sidewalls of the base;
a saltwater basin having sidewalls and concentrically located within the freshwater basin, such that the sidewalls of the saltwater basin form an inner perimeter of the freshwater basin; and
an ultrasound generator centrally located on a bottom of the saltwater basin, the ultrasound generator configured for atomizing saltwater in the saltwater basin.

2. The solar dome desalination system with enhanced evaporation as recited in claim 1, further comprising a plurality of elongated structures extending from the peak of the transparent solar paraboloid to the outer perimeter of the freshwater basin.

3. The solar dome desalination system with enhanced evaporation as recited in claim 2, wherein the plurality of elongated structures each have an outer surface with a photothermal outer layer thereon.

4. The solar dome desalination system with enhanced evaporation as recited in claim 2, wherein the plurality of elongated structures comprises a plurality of copper wires.

5. The solar dome desalination system with enhanced evaporation as recited in claim 2, wherein the plurality of elongated structures comprises a plurality of copper strips.

6. The solar dome desalination system with enhanced evaporation as recited in claim 2, further comprising a plurality of reflectors for directing additional solar rays into the solar paraboloid.

7. The solar dome desalination system with enhanced evaporation as recited in claim 1, further comprising a plurality of reflectors for directing additional solar rays into the solar paraboloid.

8. The solar dome desalination system with enhanced evaporation as recited in claim 1, wherein the base is transparent.

9. The solar dome desalination system with enhanced evaporation as recited in claim 1, wherein the base and the bottom panel of the base are square, and the sidewalls of the base comprise:
a rectangular front wall;
a rectangular right sidewall;
a rectangular left sidewall; and
a rectangular rear wall.

10. The direct solar desalination system with enhanced evaporation as recited in claim 1, further comprising:
a saltwater supply pipe for providing saltwater to the saltwater basin from a saltwater source, the saltwater source being located at a higher level than the saltwater basin, so that the saltwater flow from the saltwater source to the saltwater base is gravity driven.

11. The direct solar desalination system with enhanced evaporation as recited in claim 10, further comprising a saltwater supply valve in the saltwater supply pipe.

12. The direct solar desalination system with enhanced evaporation as recited in claim 10, wherein the saltwater source comprises a saltwater tank.

13. The solar dome desalination system with enhanced evaporation as recited in claim 12, further comprising a freshwater drainpipe for draining freshwater in the freshwater basin to a freshwater supply, the base being located at a higher level than the freshwater supply, so that the freshwater flow from the freshwater basin to the freshwater supply is gravity driven.

14. The solar dome desalination system with enhanced evaporation as recited in claim 13, further comprising a freshwater drain valve in the freshwater drainpipe.

15. The solar dome desalination system with enhanced evaporation as recited in claim 13, wherein the freshwater supply comprises a freshwater tank.

16. The solar dome desalination system with enhanced evaporation as recited in claim 15, further comprising:
a first support stand for supporting the saltwater tank; and
a second support stand for supporting the base.

17. The solar dome desalination system with enhanced evaporation as recited in claim 16, further comprising:
a third support stand for supporting the freshwater tank.

18. A solar dome desalination system with enhanced evaporation, comprising:
a transparent solar paraboloid with a peak;
a base for supporting the transparent solar paraboloid, the base including a bottom panel and sidewalls;
a freshwater basin with an outer perimeter formed by the bottom panel and sidewalls of the base;
a saltwater basin having sidewalls and concentrically located within the freshwater basin, such that the sidewalls of the saltwater basin form an inner perimeter of the freshwater basin;
an ultrasound generator centrally located on a bottom of the saltwater basin, the ultrasound generator configured for atomizing the saltwater in the saltwater basin;
a plurality of elongated copper structures extending from the peak of the transparent solar paraboloid to the outer perimeter of the freshwater basin; and
a plurality of reflectors for directing additional solar rays into the solar paraboloid.

19. The solar dome desalination system with enhanced evaporation as recited in claim 18, wherein: the plurality of elongated structures comprises a plurality of copper wires.

20. The solar dome desalination system with enhanced evaporation as recited in claim 18, wherein the plurality of elongated structures comprises a plurality of copper strips.

* * * * *